United States Patent [19]

Tanimoto et al.

[11] 4,179,584
[45] Dec. 18, 1979

[54] SYNTHETIC-SPEECH CALCULATORS

[75] Inventors: Akira Tanimoto, Kashihara; Sigeaki Masuzawa, Nara; Shinya Shibata, Nara; Shinzo Nishizaki, Nara, all of Japan

[73] Assignee: Sharp Kabushiki Kaisha, Osaka, Japan

[21] Appl. No.: 882,267

[22] Filed: Feb. 28, 1978

[30] Foreign Application Priority Data

Feb. 28, 1977 [JP] Japan .................................. 52-22083
Mar. 1, 1977 [JP] Japan .................................. 52-22514
Mar. 23, 1977 [JP] Japan .................................. 52-32487

[51] Int. Cl.$^2$ .............................................. G10L 1/00
[52] U.S. Cl. .................................. 179/1 SM; 364/710
[58] Field of Search ............ 179/1 SM; 364/710, 200, 364/900; 35/35 C

[56] References Cited

U.S. PATENT DOCUMENTS

| 3,908,085 | 9/1975 | Gagnon | 179/1 SM |
|---|---|---|---|
| 4,060,848 | 11/1977 | Hyatt | 179/1 SM |

OTHER PUBLICATIONS

L. Rosenthal et al., "Automatic Voice Response," IEEE Spectrum, Jul. 1974, pp. 61-68.

Primary Examiner—Kathleen H. Claffy
Assistant Examiner—E. S. Kemeny
Attorney, Agent, or Firm—Birch, Stewart, Kolasch and Birch

[57] ABSTRACT

A synthetic-speech calculator includes a keyboard consisting of digit keys and function keys and one or more mode selectors, a desired number of registers for storing numerical information entered by the depression of selected ones of the digit keys, a read-only-memory for storing a large number of digital codes as sound quantizing information, counter means for specifying the address of the memory so as to take a specific digital code out of the memory, a digital-to-analog converter for converting the specific digital code taken out of the memory into an audible sound signal, and a loud speaker driven by the audible sound signal and producing an audible sound. The synthetic-speech calculator is adapted such that the audible sound signals are derived via the loud speaker by at least two different methods of sound generation. For example, when a voice start key is depressed, all digits of keyed information are produced in audible form with appropriate pauses. In addition, numerical information is produced by digit by digit in audible form each time a voice start key is depressed. Numerical information is produced in a 3-digit group mode, each of the 3-digit groups being audibly produced each time the voice start key is depressed. Finally, numerical information may be audibly produced in order of ascending significance relative to the least significant digit or in order of descending significance relative to the most significant digit. The mode selector directs the synthetic-speech calculator how to derive the audible sound signals via the loud speaker.

16 Claims, 10 Drawing Figures

SYNTHETIC-SPEECH CALCULATORS

BACKGROUND OF THE INVENTION

The present invention relates to an improvement in a synthetic-speech calculator.

A synthetic-speech calculator is well known in the art of calculators. The prior art synthetic-speech calculator was adapted such that audible sounds indicative of operation results were derived at a fixed speed, on a fixed order and in a fixed way. Therefore, it was very difficult to transfer the operation results which were audibly dictated onto a slip of paper.

SUMMARY OF THE INVENTION

Accordingly, it is an object of the present invention to provide an improvement in a synthetic-speech calculator which can produce audible sounds, indicative of operation results, in one of a variety of selectable ways.

In order to achieve the above described object, a synthetic-speech calculator embodying the present invention is adapted such that audible sound signals are derived via the loud speaker in at least two different ways. For example, when a voice start key is depressed, all digits of keyed information are produced in audible form with appropriate pauses. In addition, numerical information is produced digit by digit in audible form each time a voice start key is depressed. Numerical information is produced in a 3-digit group mode, each of the 3-digit groups being audibly produced each time the voice start key is depressed. Finally, numerical information may be audibly produced in order of ascending significance relative to the least significant digit or in order of descending significance relative to the most significant digit. A mode selector is provided to direct the synthetic-speech calculator how to derive the audible sound signals via the loud speaker. The synthetic-speech calculator includes generally a keyboard consisting of digit keys and function keys, a desired number of registers for storing information entered by the depression of selected ones of the digit keys, a read-only-memory for storing a large number of digital codes as sound quantizing information, counter means for specifying the address of the memory so as to take a specific digital code out of the memory, a digital-to-analog converter for converting the specific digital code taken out of the memory into an audible sound signal, and a loud speaker driven by the audible sound signal and producing an audible sound.

In one preferred form of the present invention, audible sound signals indicative of operation results are derived via the loud speaker in succession without any pause therebetween. Audible sounds indicative of operation results may be derived digit-by-digit or group-(consisting of three digits)-by-group. In another preferred form of the present invention, audible sound signals indicative of operation results are derived in the significance ascending order in one of the operation modes. Alternatively, in another operation mode audible sounds are derived in the significance descending order. Further, it is possible to derive audible sounds indicative of operation results in one of a variety of languages.

BRIEF DESCRIPTION OF THE DRAWINGS

Other objects and novel features of the present invention are set forth in the appended claims and mode of operation will best be understood from a consideration of the following detailed description of the embodiment taken in conjunction with the accompanying drawings, wherein;

DETAILED DESCRIPTION OF THE INVENTION

Figure 1:
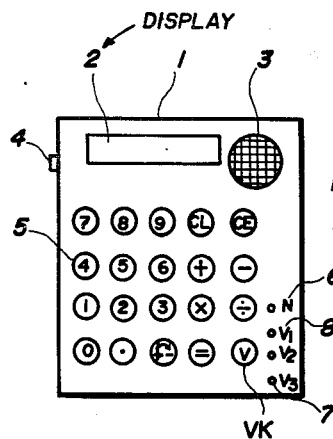
FIG. 1 is a front panel layout of a synthetic-speech calculator embodying the present invention.

Referring now to FIG. 1 of the drawings, there is illustrated a synthetic-speech calculator embodying the present invention, which includes a body 1, a display 2, a loud speaker 3, a power switch 4, digit keys and function keys 5 and a mode selector 6. When a knob is shifted to any of the positions which denote possible audible sound delivery modes, numerical information being displayed is audibly indicated in the selected audible sound delivery mode. An LED 7 visually indicates the audible sound delivery mode selected by the selector 6. A voice start key VK is provided.

Figure 2:
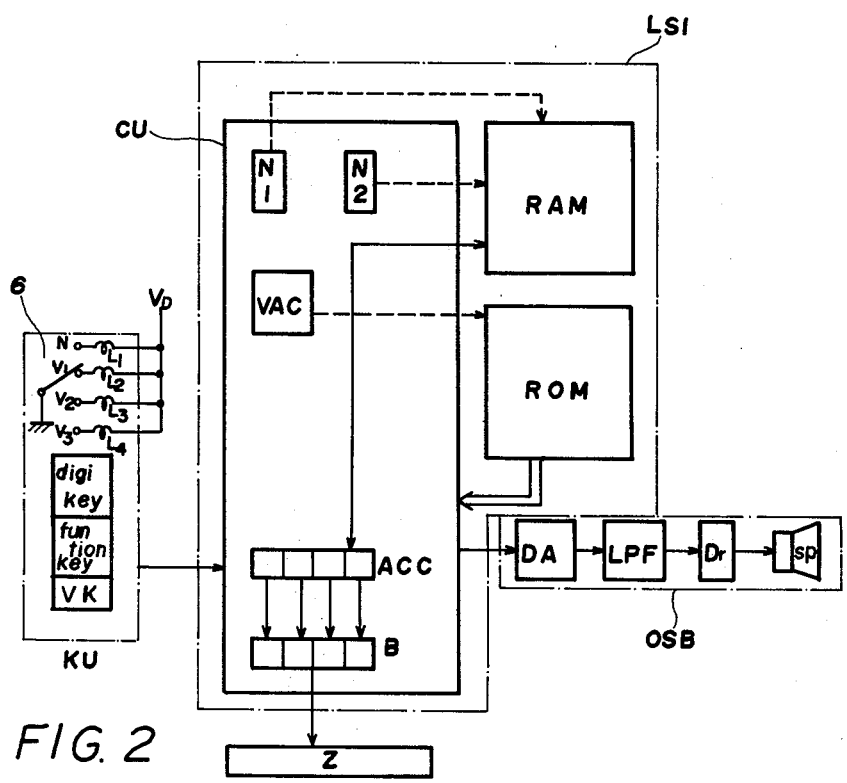
FIG. 2 is a block diagram of the synthetic-speech calculator shown in FIG. 1.

As is obvious from FIG. 2, the calculator consists essentially of a keyboard KU, a central processor LSI chip LSI, the display 2 and a sound output OSB. The speech synthesis technique is fully disclosed in many of U.S. Patents, for example, U.S. Pat. No. 3,102,165, SPEECH SYNTHESIS SYSTEM to Genung L. Clapper and U.S. Pat. No. 3,398,241, DIGITAL STORAGE VOICE MESSAGE GENERATOR to Lyle H. Lee.

The mode selector 6 on the keyboard KU can specify a normal mode N (no audible sound) and three audible sound modes $V_1$, $V_2$ and $V_3$. As noted earlier, the LEDs $L_1$–$L_4$ provide the visual diplay of a selected one of the modes N, $V_1$–$V_3$. An output from the mode selector 6 is supplied to the LSI chip LSI. The above described three modes $V_1$–$V_3$ are adapted to produce audible sounds in the following manner.

[$V_1$ mode]

If the sound start key VK has been operated once, then all digits of numeral information are produced in succession in an audible form. Assume now that a register is storing "012,345.6." Upon the depression of the voice start key VK, "one," "two," (pause) "three," "four," "five," "point," (pause) and "six" are successively announced in an audible form. In this case an audible sound is not provided with respect to spurious zero. An appropriate pause is imposed immediately after the decimal point and each of the three-digit punctuation referring to the decimal point, making clear even in an audible form the overall position of numerical information and a partition between the fraction portion and integer portion of numerical information.

In the case where the register stores "01.23456," the depression of the voice start key VK starts producing audible sounds "one," "point," (pause) "two," "three," "four," "five" and "six." Numerical information in the fraction portion is derived successively in an audible form without any pause.

[$V_2$ mode]

Numerical information is produced digit-by-digit in an audible form each time the voice start key VK is depressed. For example, a register stores "123.456."

the voice start key VK depressed→"one"
the voice start key VK depressed→"two"
the voice start key VK depressed→"three" and "point"
the voice start key VK depressed→"four"
the voice start key VK depressed→"five"
the voice start key VK depressed→"six"

In this case, the decimal point is derived in an audiable form concurrently with the digit "three." Of course, spurious zero are not announced.

[$V_3$ mode]

Numerical information is announced three-digit group by three-digit group with reference to the decimal point each time the voice start key VK is depressed. For example, a register stores "12345678."

the key VK depressed→"one," "two"
the key VK depressed→"three," "four," "five"
the key VK depressed→"six," "seven," "eight" and "point"

Since the above given numerical information is punctuated as "12," "345" and "678," the two most significant digits contain only two digits.

Another example is given as follows: "1234.5678"

the key VK depressed→"one"
the key VK depressed→"two," "three," "four," "point"
the key VK depressed→"five," "six," "seven," "eight"

In this case the fraction portion contains four digits and thus the fraction portion is announced successively irrespective of the three-digit punctuation.

The depression of the keys on the keyboard KU is transmitted to the LSI chip. The LSI chip includes a random-access-memory RAM serving as registers, a read-only-memory ROM containing a control program and constants and a central processor unit CU performing various logic operations on keyed data. More particularly, the central processor unit CU comprises a counter $N_1$ specifying rows of the RAM, a second counter $N_2$ specifying columns of the RAM, an address counter VAC specifying addresses of the ROM, an accumulator register ACC, a display buffer register B and other logic means. The central processor CU achieves desired control performances in response to key operations on the keyboard KU.

With such an arrangement, when any digit key on the keyboard KU is depressed, its associated coded numerical information is loaded into a given area of the RAM via the accumulator register ACC. The contents stored in the RAM are supplied to the display 2 via the accumulator register ACC and the buffer register B. Sound quantizing digital codes indicative of digits "one," through "nine," "point" are previously loaded into the ROM together with other control programmed instructions. If it is desired to announce the voices "one," "two," "three" and so forth from the voice output OSB, the above described address counter VAC will specify the initial address of an area of the ROM containing a desired voice. Subsequent to this, digital codes are sequentially derived out of the ROM and then supplied to the voice output OSB via the central processor, producing its synthesized voice.

The voice output OSB includes a digital-to-analog converter DA for converting digital codes into analog signals, a low-pass filter LPF for converting the outputs of the digital-to-analog converter into analog voice waves and a loud speaker SP enabled by the analog voice waves.

Figure 3:
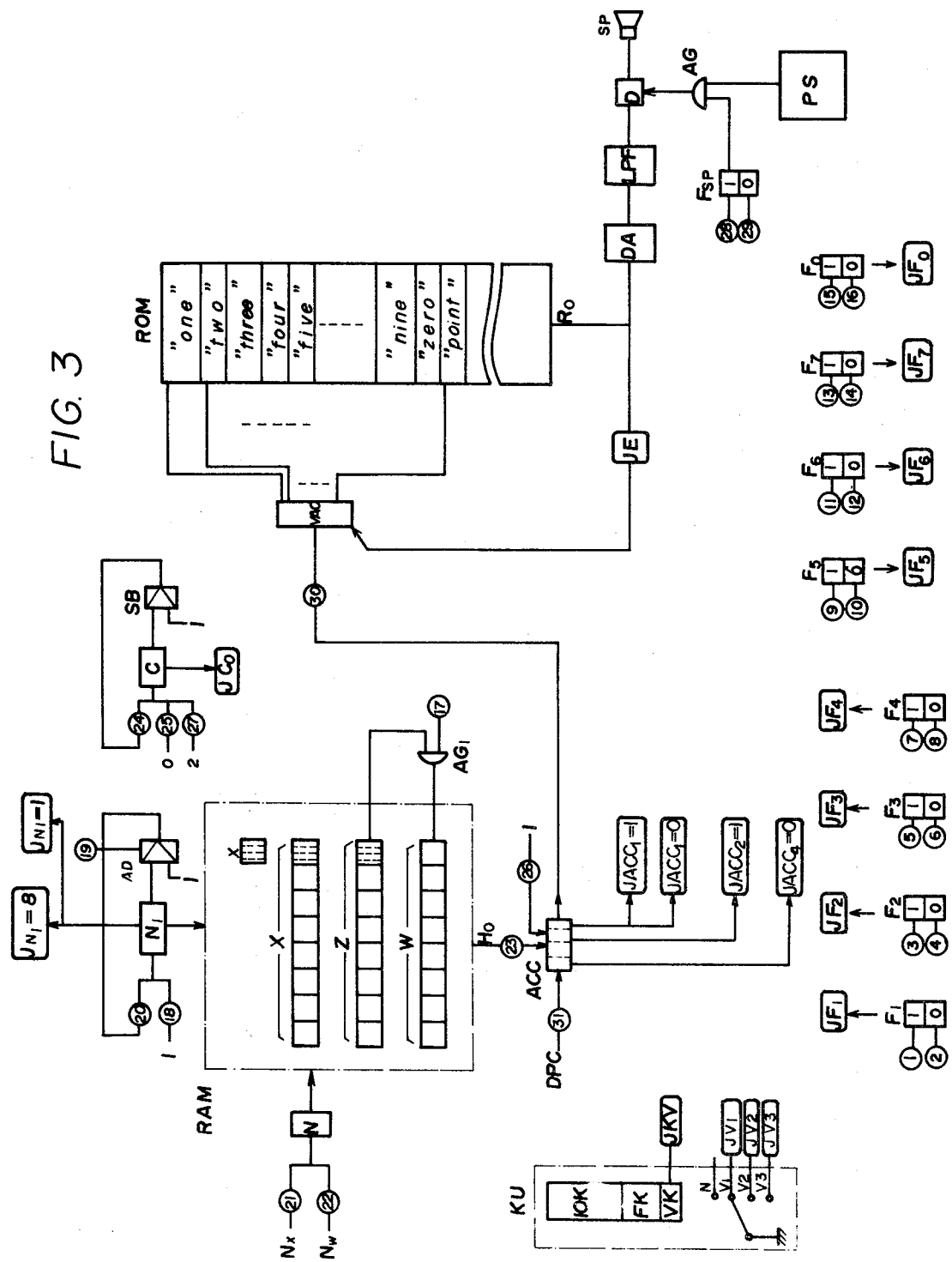
FIG. 3 is a detailed block diagram of a portion of the synthetic-speech calculator shown in FIG. 2.

FIG. 3 illustrates a detailed diagram of the synthetic-speech calculator. The components in FIG. 3 are given the same numbers as in FIG. 2 wherever possible in order to point up the close relationship. A circle ⓝ shows a micro-instruction and a rectangle ▭ shows decision means. The RAM contains a numerical register X storing entered information or operation results, a zero suppress register Z which is also available for operation purposes, a voice output register W, and a decimal point register X, each digit consisting of four bits. Numerical information is written into and read out of the respective ones of the registers through the use of the accumulator register ACC. When it is desired to introduce numerical information into a specific digit position i of the X register within the RAM, a specific column code NX corresponding to the X register should be stored in the counter $N_2$ and a specific line code corresponding to the i digit (e.g., binary coded decimal code) should be stored in the counter $N_1$. Thereafter, the contents of the accumulator ACC are transferred into the RAM.

The contents of the counter $N_2$ are determined by micro-instructions ㉑ and ㉒. The counter $N_1$ is an up/down counter which is incremented or decremented by action of an adder/substractor AD. The adder/substractor AD operates as an adder in the presence of a micro-instruction ⑲ and as a subtractor in the absence of that micro-instruction ⑲.

In the given example, the contents of the Z register are transferred into the W register via a gate $AG_1$. In other words, the counters $N_1$ and $N_2$ specify $Z_i$ within the RAM and the contents of $Z_i$ are introduced into ACC. Subsequently, the counters $N_1$ and $N_2$ specify $W_i$ within the RAM and $W_i$ stores the contents of ACC. Such procedure is repeated n times.

A counter C is a down counter which is available for producing punctuation signals. SB is a subtractor. A micro-instruction ㉕ is developed when the counter C is due clear. The counter C is loaded with "2" when a micro-instruction ㉗ is developed. The punctuation signals are produced every third digit with reference to the decimal point position. When the decimal point is sensed, the counter C is loaded with "2." The counter C is one decremented every one-digit change. The punctuation signals may be produced when a decision logic JIO senses "0" (that is, C=0). The read-only-memory ROM is illustrated as having only a sound data storage for illustration purposes.

All that is necessary to derive sound quantizing digital codes corresponding to the contents stored in the accumulator register ACC is to load the address counter VAC with the initial address of the audible sound corresponding to the contents of the ACC. Subsequent to this, the counter VAC continues incrementing automatically while the digital codes are sequentially derived from RO and supplied to the digital-to-analog converter. An END code is imposed at the end of each group of the digital codes and, if it is derived from the ROM, an END code decision logic JE becomes operative thereby placing the counter VAC into the reset state.

While the loud speaker SP may be enabled at all times, a power supply PS is connected to the speaker driver DR only when announcing information to eliminate the effects of noise. The power supply PS is under the control of a flip flop $F_{SP}$ and a gate AG. $F_1-F_7$ and FD are R-S type flip flops while $JF_1-JF_7$, JFD, JKV, $JV_1-JV_3$ are decision logic. $JACC_1=0$ is means for deciding whether the contents of the first bit of the accumulator register ACC are "1." $JACC_1=0$, $JACC_2=1$ and $JACC_4=0$ are similarly decision logic. The other components in FIG. 3 expect RAM, ROM, DA, LPF, DR, SP, PS, and KU are provided within the central processor unit CU shown in FIG. 2. The announcing function will be explained in the case where the X register stores "0001234.5" as operation results.

Figure 4:
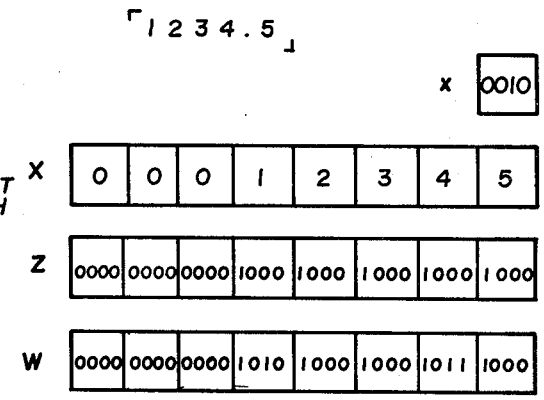
FIG. 4 is an example of the contents of respective registers contained within the synthetic-speech calculator.

FIG. 4 shows the contents of the register $\overline{X}$ and X immediately after operation results are calculated. Z and W store all zeros. The zero suppression can be effected for displaying purposes as soon as the operation results are obtained. After completing the zero suppression W remains unchanged (that is, "0"). The situation will not change unless the voice start key VK is depressed.

The respective bits of the Z register have particular meanings as follows.

the fourth bit = "1" ... means that the corresponding digit position of the X register contains an effective or significant digit the fourth bit = "0" ... means that the corresponding digit position of the X register contains spurious zero or insignificant zero or digit the first bit = "1" ... means that the corresponding digit position of the X register contains the decimal point.

It will be noted that the second and third bits have no particular meanings. In the synthetic-speech calculator there is provided a visual display of only the digit positions of the X register which correspond to "1s" in the fourth bits of the Z register.

Provided that the voice start key VK is depressed under such circumstances, the W register receives voice output information as shown in FIG. 4 thereby initiating the voice announcing mode. Each bit $W_{ni}$ of respective digit positions $W_n$ of the W register can be defined as follows.

$W_{n1}$: the first bit = 1 ... the corresponding digit position of the X register contains the decimal point $W_{n2}$: the second bit = 1 ... the corresponding digit position of the X register contains information just before the three-digit punctuation $W_{n4}$: the fourth bit = 1 ... the corresponding digit position of the X register contains significant information Review of the contents of the W register shown in FIG. 4 reveals the following fact.

Figure 5:
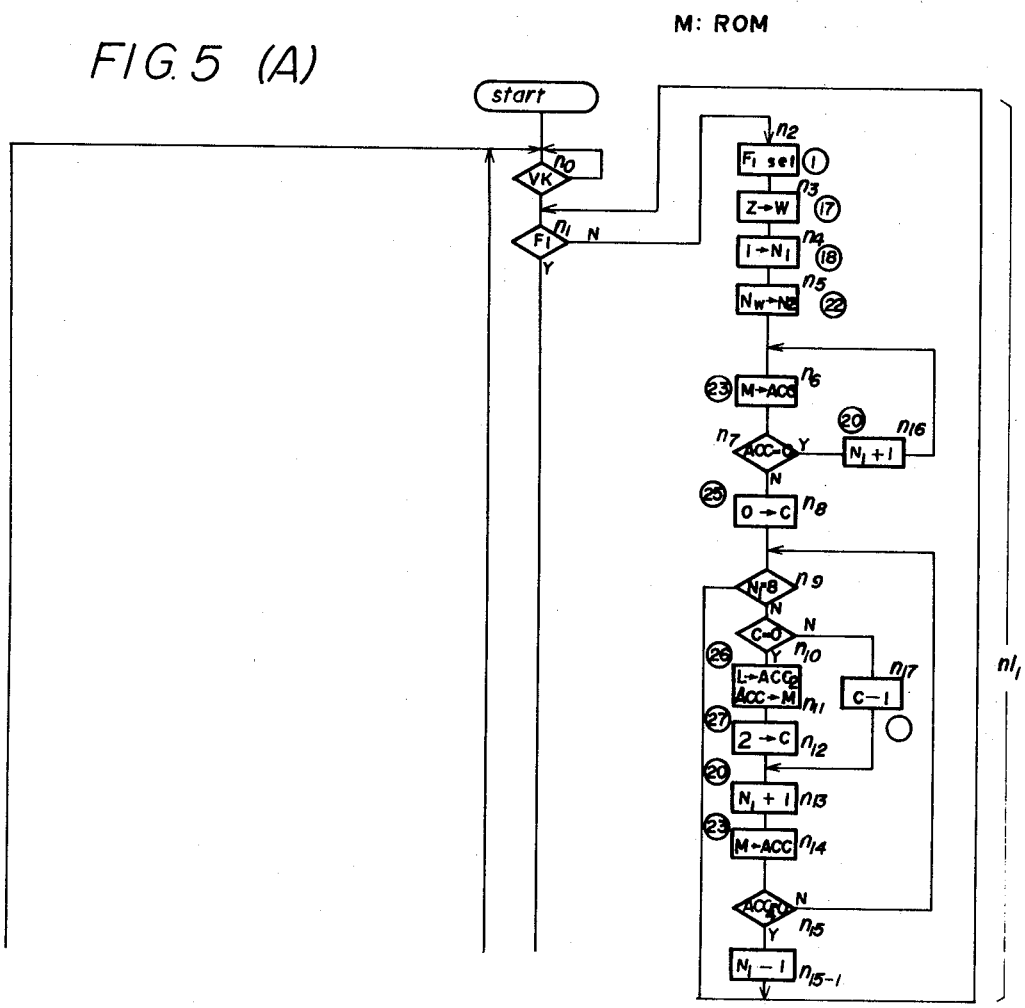
FIGS. 5A, 5B and 6 are flow charts for the illustration of the operation of the synthetic-speech calculator.
Figure 5:
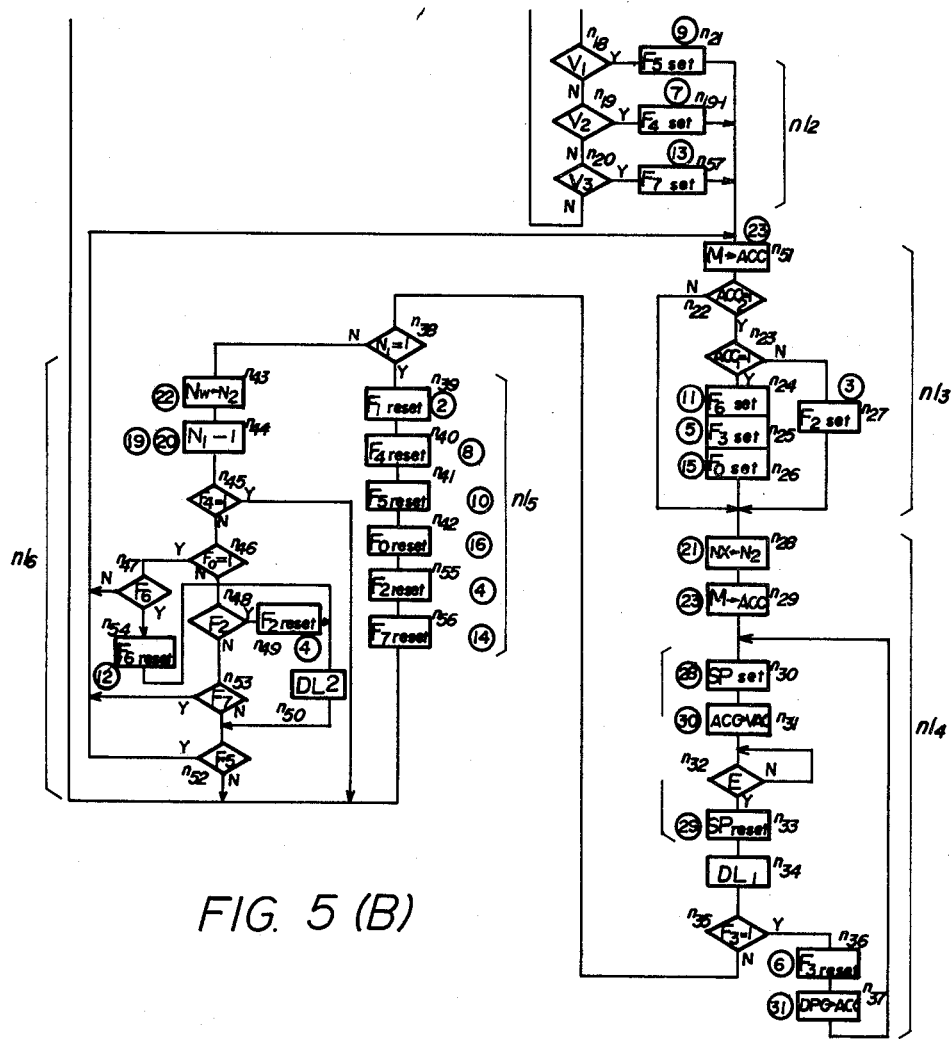

$W_1-W_5$ ... significant digits $W_2$ ... significant digit, decimal point digit, and punctuated digit $W_5$ ... significant digit and punctuated digit $W_6-W_8$ ... insignificant digits FIG. 5 is a flow chart showing details of operation of the synthetic-speech calculator embodying the present invention. Under the initial stages the registers $\overline{X}$ X and Z assume the contents as shown in FIG. 4 and the remaining register W contains "0". The step $n_0$ is carried through to sense the depression of the voice start key VK by the decision logic JKV. If JKV=0 (no depression of VK), the step no is repeated. JKV=1 permits the next step $n_1$ to start. The step $n_1$ is carried through to decide whether the voice start key VK has been depressed for the first time or the second or succeeding time. This is accomplished by sensing the state of the flip flop $F_1$ through the use of the decision logic JF 1.

In other words, since the flip flop $F_1$ is set in response to the depression of the key VK so that $F_1=0$ means that the VK key has been depressed for the first time and $F_1=1$ means that the same has been depressed for the second or succeeding time. In the case of the first depression of the VK key the relationship $F_1=0$ is present thereby selecting a branch NO, this branch being connected to voice output information formation routine $nl_1$ consisting of $n_2-n_{17}$. This routine permits the W register to assume information as shown in FIG. 4 in accordance with the contents of the Z register.

A mode decision routine $nl_2$ consists of steps $n_{18}-n_{20}$ for the purpose of sensing which of the modes the mode selector 6 demands through the use of the decision logic circuits JV1-JV3. The $V_1$ mode storing flip flop $F_5$ is set at the $V_1$ mode, the $V_2$ mode storing flip flop $F_4$ is set at the $V_2$ mode and the flip flop $F_7$ is set at the $V_3$ mode. These flip flops are provided not to discontinue the operation results announcing mode even if the mode selector 6 is shifted in the midst of that announcing mode.

A routine $nl_3$ is arranged to sense if a digit to be announced concerns decimal point, punctuation or other information, placing these associated flip flops into the set state as a result of such detection.

A routine $nl_4$ is arranged such that the accumulator register ACC accepts the contents of the specific digit of the X register corresponding to the specific digit of the W register decided by the $nl_3$ routine, producing audible sounds in accordance with the contents of the accumulator register ACC. During the routine $nl_4$ audible sounds of only one digit content are provided. The step $n_{38}$ determines through the use of the decision logic $JN_1$ whether the announcing mode has been ended with the least significant digit $X_1$ of the X register. After the announcing mode has been completely terminated, an announcing end routine $nl_5$ is initiated whether the mode selector is in any of the three modes $V_1-V_3$. Otherwise, a next digit selection routine $nl_6$ is selected. The announcing end routine $nl_5$ is carried through to restore the flip flops to the set state during the routine $nl_1-nl_4$ into the original or reset state.

During the next digit selection routine $nl_6$ the next succeeding digit is selected to be announced and decision is made as to whether there is to be restored to the initial state or the routine $nl_3$.

In this manner, a flow chart of the synthetic-speech calculator consists generally of the steps $n_0$, $n_1$ and $n_{38}$ and the routines $nl_1-nl_6$.

[$nl_1$ mode]

This is initiated by the first depression of the voice start key VK such that the second bit $W_{n2}$ of the punctuation digit is allowed to store "1" based upon the decimal point information and significant digit information stored in the Z register.

While in the routine $nl_1$, $F_1$ is set (the step $n_2$) and the contents of the Z register are transferred to the W register (the step $n_3$). The counters $N_1$ and $N_2$ store "1" and NW respectively so that, after specifying $W_1$ of the RAM, the contents of $W_1$ are loaded into the accumulator register ACC (the steps $n_4-n_6$). The next succeeding steps $n_7$ and $n_{16}$ are achieved for decimal point processing. The decision logic JACC 1 determines whether the first bit ACC 1 of the ACC register is "1" or "0." If ACC=0 the counter $N_1$ is incremented (the step $n_{16}$), taking up the next succeeding digit for the introduction into the ACC register. Such procedure keeps on until $ACC_1=1$ is evaluated. When $ACC_1=1$ the accumulator register ACC is allowed to store the decimal point inforamtion. In the given example, $W_1$ is "1000" and $ACC_1$ is "0." The $N_1$ counter is incremented to "2." During the procedure $W_2 \rightarrow ACC$, $ACC_1=1$ and $W_2$ contains the decimal point information. The counter C is cleared to "0" at the step $n_8$ in preparation for the establishement of the punctuation digit. The step $n_9$ decides if the $nl_1$ routine is to be terminated. In the case where the contents in the ACC register correspond to the most significant digit position of the W register, the following procedure is discontinued and restored to the step $n_1$. This is accomplished by the decision logic $JN_1$.

During the steps $n_{10}$-$n_{15}$ and $n_{17}$ the second bit of the third digit punctuation digits stores "1." The step $n_{10}$ is effected as to whether C=0. After the second big of the ACC register are transferred to a specific digit in the RAM in the step $n_{12}$. The step $n_{12}$ is of importance in obtaining the punctuation digit as in the step $n_{17}$. During the steps $n_{13}$ and $n_{14}$ the next succeeding digit of the W register is transferred to the ACC register. During the step $n_{15}$ the desicion logic $JACC_4$ decides whether such transferred digit is significant or insignificant. When the insignificant digit is detected in the step $n_{15}$, the procedure $N_1-1$ is carried through returning back to the step $n_1$. Any insignificant digit or spurious zero is not announced.

In the case of significant digits the step $n_{17}$ is effective with intervening step $n_9 \rightarrow n_{10}$.

When $W_2$ is detected relevant to the decimal point information in the step $b_7$, the step $n_8$ and $n_9$ are carried through, followed by the step $n_{10}$. If C=0 the step $n_{11}$ is effected such that the second bit $ACC_2$ of the ACC register receives "1" indicative of the punctuation digit in response to a micro-instruction 26. Therefore, ACC=1011 and $W_2$ stores 1011. The procedures $2 \rightarrow C$ and $W_3 \rightarrow ACC$ are carried through. $W_3=1000$ permits the steps $n_9$ and $n_{10}$ to proceed. Since C=2 in the step $n_{10}$, the step $N_{17}$ is followed to perform the procedure C−1=1. A sequence of the step $n_{13} \rightarrow n_{14} \rightarrow n_9 \rightarrow n_{10} \rightarrow n_{17} \rightarrow n_{13}$ is repeated until C=1 is eventually resulted. Therefore, $W_3 \rightarrow ACC$, C=2; $W_4 \rightarrow ACC$, C=1; and $W_5 \rightarrow ACC$, C=0 in the given example. When $W_5$ is loaded into the ACC register, C=0 is present with the meaning that the point of C=0 corresponds to the third digit punction form the decimal point position. Upon the relationship C=0 sensed, the step $n_{11}$ is selected so that the second bit of $W_5$ corresponding to the punctuation digit receives "1."

The operation $2 \rightarrow C$ is carried through again in the step $n_{12}$. If digits higher than $W_5$ contain significant digits the same procedure is repeated. In the given example, $W_6 \rightarrow ACC$ is effected during the step $n_{13}$ and $n_{14}$. $ACC_4=0$ in the step $n_{15}$ permits the step $n_{15}'$ to effect substraction of "1" from the counter $N_1$, completing the $n_1$ routine and returning to the step $n_1$.

[$n_1$ step, $nl_2$ routine]

Since $F_1=1$ in the step $n_1$ the YES branch toward the $nl_2$ routine is selected. Providing that any mode of the three modes $V_1$-$V_3$ is not selected, the $n_0$ step is restored. In other words, any sound is not produced even upon the depression of the key VK. If it is assumed that the $V_1$ mode is selected, the flip flop $F_5$ is urged into the set state in the steps $n_{18}$ and $n_{21}$ directing toward the step $n_{51}$.

[$nl_3$ routine]

Under these circumstances the counter $N_1$ stores NW and the counter $N_2$ stores "5" such that the ACC register receives the contents "0101" of $W_5$ corresponding to the most significant digit position of effective numerical information (the step $n_{51}$). Then, the steps $n_{22}$ and $n_{23}$ determine whether that derived digit concerns the decimal point information, the punctuation digit information or other digit information.

If it concerns the decimal point information ($ACC_1=1$), an appropriate pause will be imposed so as to make a distinction between the fraction portion and integer portion. The pause flip flop $F_6$, the decimal point flip flop $F_3$ and the fraction portion flip flop FD are respectively set in the steps $n_{24}$, $n_{25}$ and $n_{26}$.

In case of the punctuation digit ($ACC_2=1$) the punctuation flip flop $F_2$ is set. Otherwise, no action is carried, followed by the step $n_{28}$. In the given example $W_5 \rightarrow ACC$, $ACC_2=1$ and $ACC_1=0$ so that the $F_2$ flip flop is set to enable the $nl_4$ routine. [$nl_4$ routine]

There is audibly announced numerical information of the digit position of the X register corresponding to the digit detected during the routine $nl_3$. During the step $n_{28}$ the counter $N_2$ is loaded with NX code to specify the corresponding digit of the X register. The corresponding digit of X register is transferred into the ACC register ($X_5=0001$ in the given example).

The flip flop SP in the step $n_{30}$ is set to enable the speaker SP through the power supply PS. In the following step $n_{31}$ the address of the ROM is specified in accordance with the contents of the ACC. By transferring the contents "0001" into the ACC, the initial address of an area of the ROM containing the sound "one" is established. Then, the address counter VAC is free running until the END code, sending the sound digital codes to the digital-to-analog converter DA. Therefore, the loud speaker SP announces audible sounds "one." The decision logic JE detects the END code derived from the ROM. In the next succeeding step $n_{33}$ the flip flop SP is reset.

Figure 6:
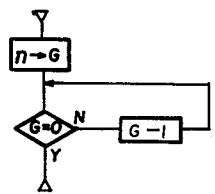

A delay circuit in the step $n_{34}$ becomes operable to intervene a pause of about 0.2–0.5 sec. long between voices. To this end a counter G as shown in FIG. 6 is loaded with a given value n and decremented to "0" upon receipt of system clocks. The step $n_{35}$ determines through the decision logic $JE_3$ whether the just announced sound is the decimal point containing digit. If YES is answered, the steps $n_{36}$ and $n_{37}$ are selected. Otherwise the step $n_{38}$ is selected.

The steps $n_{36}$ and $n_{37}$ are available in announcing "point." $F_3$ is reset and then the decimal point initial address DPC is loaded into the ACC register. The steps $n_0$-$n_{35}$ are sequentailly executed for decimal point announcing mode, the loud speaker SP to deliver sound "point." The step $n_{35}$ must be followed by the step $n_{38}$ because of $F_3=0$. In the given example the calculator advances toward the step $n_{38}$ without passing the steps $n_{36}$ and $n_{37}$ because of $X_5=0001$. The step $n_{38}$ determines whether the sound announcing mode has been completed.

[$nl_6$ routine]

The counters $N_1$ and $N_2$ are loaded with ($N_1-1$) and NW, respectively in order that the specific digit correspondingly to the digit one-digit less significant than the just announced digit of the X register is taken up from the W register and then provided for the ACC register.

The decision logic JF4 in the step $n_{45}$ determines whether the mode selector is in the $V_2$ mode. When the $V_2$ mode is selected, ($F_4=1$), the "YES" branch is selected to return back to the step $n_0$. In other words, the step $n_0$ is returned at a moment that $N_1=4$ and $N_2=NW$ in the steps $n_{43}$ and $n_{44}$. Any sound is produced behind the sound "one" until the sound key VK is depressed. Upon the depression of the sound key Vk the steps $n_1 \rightarrow n_{18} \rightarrow n_{19} \rightarrow n_{19}, \rightarrow n_{51}$ are executed to thereby produce audible sound "two" in response to "2" in $X_4$. In the given example (not in the $V_2$ mode) the step $n_{46}$ follows, which determines through the use of FD whether the announced digit belongs to the integer portion or fraction portion. In the given example ($X_5=1$) the step $n_{48}$ is executed to determine whether the just announced digit information through the use of $F_2$ concerns the punctuation digit. Because $X_5$ is the punctuation digit and $F_2$ is "1," the steps $n_{49}$ and $n_{50}$ are selected to impart an appropriate pause. A delay circuit $DL_2$ offers a relatively long pauses (for example, about 1 second). $F_2$ is reset in the step $n_{49}$ without any influence upon the next digit processing.

The step $n_{52}$ senses the $V_1$ mode and, if so, renders the step $n_{51}$ operable so as to produce audible sounds of lower digit information. If the $V_3$ mode is in force, the no step is restored and ready for the depression of the key VK.

In other words, the announcing mode is halted for the punctuation digit in case of the $V_3$ mode. In the given example ($V_1$ mode) the $n_{51}$ step is executed while the ACC register is loaded with $W_4=1000$. By executing the steps $n_{28}$, $n_{29}$ through $n_{35}$ the contents "2" of the $X_4$ of the X register are announced in the form of voice "two." Since the $X_4$ concerns neither the decimal point digit nor the least significant digit information, the step $n_{38}$, $n_{43}$, $n_{45}$ and $n_{46}$ are executed. The step $n_{48}$ follows and detects the state of the $F_2$ flip flop. It concludes that no punctuation digit information is detected because of $F_2=0$.

The step $n_{53}$ determines in view of the state of the $F_7$ flip flop whether the mode switch is in the $V_3$ mode. If so, the step $n_{51}$ is selected for the purpose of announcing the next succeeding digit information. While the calculator is ready for the depression of the VK key when the punctuation digit information, for example, "1" has been already announced, the calculator is advanced automatically to the lower digit information announcing mode when the ones other than punction digit, for example "2" have been announced. In the given example (not in the $V_3$ mode) the step $n_{52}$ is executed and then the step $n_{51}$ is returned. After the above operation is achieved for $X_3=3$, the step $n_{51}$ is reached again so that the ACC register receives $W_2 (=1011)$.

In this manner, audible sounds are produced in the order of "one," "two," "three." The pause period imposed between the sounds "one" and "two" is of a length equal to a sum of the delay times of the first and second delay circuits $DL_1$ and $DL_2$, whereas the pause period between the pause period between the sounds "two" and "three" is of a length equal to the delay time of the first delay circuit $DL_1$.

Meanwhile, because of $W_2=$"1011," the $ACC_2=1$ and $ACC_1=1$ so that it is evaluated as the decimal point digit information in the step $n_{23}$, urging the flip flops $F_6$, $F_3$ and FD into the set state. Similarly, sounds "four" ($X_2=4$) are produced in the chained steps $n_{28}$-$n_{34}$.

Since $F_3=1$ is sensed in the step $n_{35}$, a series of the steps $n_{36}$, $n_{37}$, $n_{30}$-$n_{34}$ is selected to produce audiable sounds "point." Subsequently, $F_3=1$ is developed in the step $n_{35}$, followed by the step $n_{38}$. Operation is executed through the steps $n_{43}$ through $n_{45}$, $n_{46}$ and $n_{47}$(FD=1).

The step $n_{47}$ determines via JF6 whether the announcing mode concerns the decimal point information. $X_2=4$ and $F_6=1$ permit the step $n_{54}$ to be executed. A loop of the steps $n_{54}$, $n_{50}$ and $n_{52}$ is to impose the pause. The flip flop $F_6$ is reset in the step $n_{54}$.

The step $n_{51}$ is returned again because of the $V_1$ mode in the step $n_{52}$. If the mode selector is in the $V_3$ mode, the step $n_0$ is returned in preparation for the depression of the VK key. As far as the mode selector is held in the $V_3$ mode, the announcing mode is halted immediately after the decimal point information.

The step $n_{51}$ is revived directly when $F_6=0$ in the step $n_{47}$. This implies that the overall fraction portion is to be announced digit by digit at a fixed interval whether the $V_1$ mode or the $V_3$ mode. For example, the fraction portion following "2" is sequentially announced through the steps $n_{23}$, $n_{38}$, $n_{43}$, $n_{44}$ ... $n_{47}$, $n_{51}$ and $n_{23}$.

Once the Acc register has been loaded with $W_1(=1000)$ in the step $n_{51}$, the steps $n_{22} \rightarrow n_{28} \rightarrow ... \rightarrow n_{35}$ are sequentially executed because of $ACC_1=0$, announcing sounds "five" indicative of the contents of $X_5$. Under the condition $N_1=1$ so that the YES branch is selected in the $n_{38}$ step. The announcing mode end routine is due.

[nl5 routine]

$F_1$, $F_4$, $F_5$, FD, $F_2$ and $F_7$ are reverted to the reset state in the steps $n_{39}$-$n_{42}$, $n_{55}$ and $n_{56}$. Upon the completion of this routine the step $n_0$ is returned.

As noted above, in case of the $V_1$ mode "one," "two," "three," "four," "point" "five" are sequentially announced. In case of the $V_2$ mode of the rode of operation is substantially similar except that $F_4$ is set in the step $n_{19'}$. The mode of operation in the mode $V_3$ is also similar to the modes $V_1$ and $V_2$ except that $F_7$ is set in the step $n_{20}$ and $n_{57}$.

Figure 7:
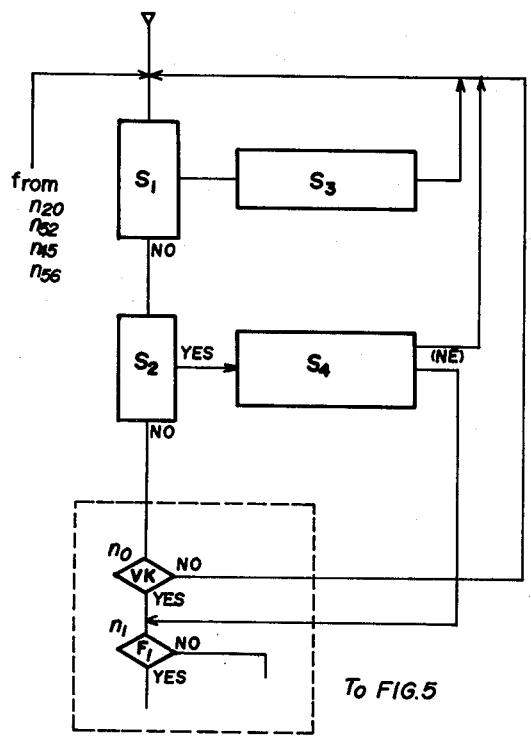
FIG. 7 is a flow chart for the illustration of the modified operation of the synthetic-speech calculator.

While in the above discussed embodyment the announcing mode is initiated by the depression of the key VK, the announcing mode can start automatically as soon as calculator have been duly executed. Another embodiment of FIG. 7 is provided for the above described purpose which includes additionally routines $S_1$ through $S_4$. The routine $S_1$ is a specific digit key and, if a specific digit key depressed is sensed, selects the $S_3$ routine. If the depression of digit keys is not sensed, the $S_2$ routine is selected to sense the depression of s specific function key. In the $S_3$ routine operations responsive to a digit key or keys, for example, read-in of data, shift of a register are executed. On the other hand, in the $S_4$ routine operations responsive to the depression of a function, for example, calculations and conditioning are carried through. Provided that a calculation end signal NE is developed in the $S_4$ routine, the step $n_1$ is restarted for advancing to the above described announcing mode. Otherwise, the $S_1$ routine is returned back. In other words, the announcing mode is organized in response to the signal NE irrespective of depression of the key VK.

Figure 9:
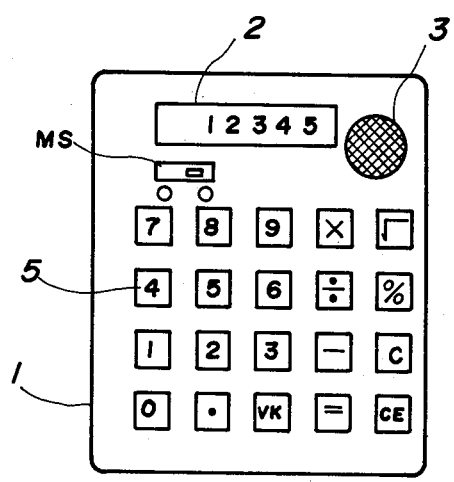
FIG. 9 is the perspective of the embodiment shown in FIG. 8.
Figure 8:
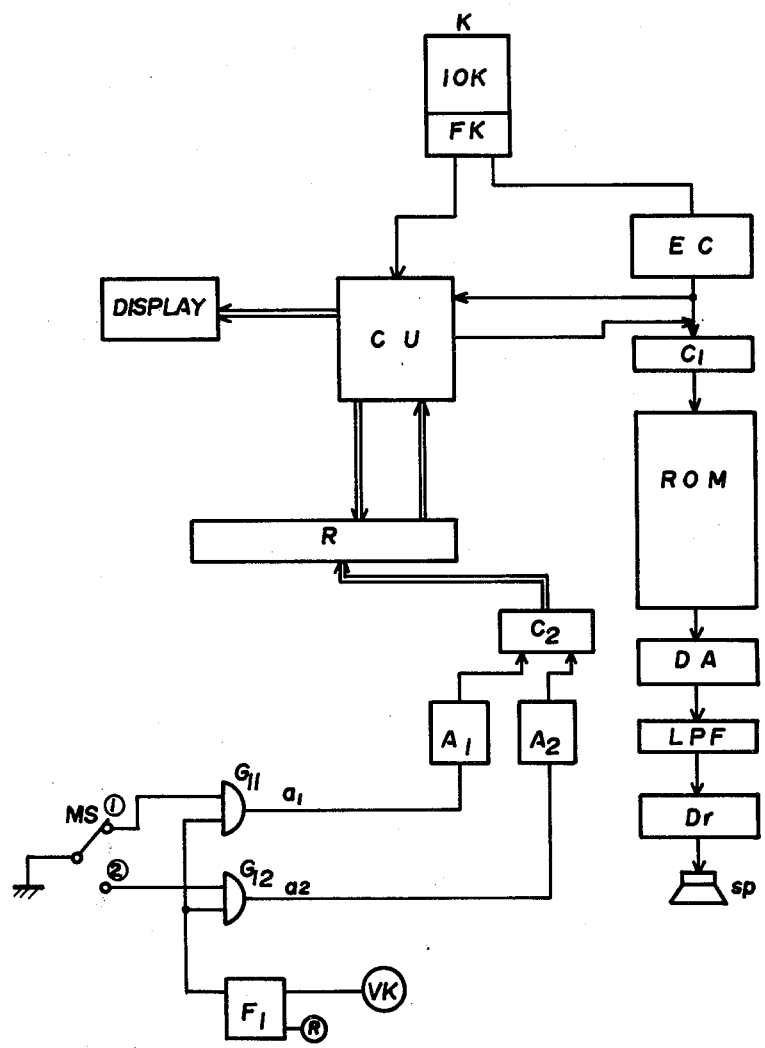
FIG. 8 is block diagram of still another embodiment of the present invention.

Still another embodiment of the present invention shown in FIGS. 8 and 9 is adapted such that audible sounds are produced in either of two selectable modes, that is, in the significance descending order or in the significance ascending mode.

In FIG. 8, a counter $C_2$ is provided of which the radix corresponds to the number of digits of a numerical register R. $I_S$ is a count increment control for the counter $C_2$ while $A_2$ is a count decrement control for the counter $C_2$. A mode selector MS has two selectable contacts ① and ②, the one connected to an input to an AND gate $g_{11}$ and the other connected to an input to an AND gate $g_{12}$. A flip flop $F_1$ responds to a microinstruction Ⓥ$\overline{K}$ as a set input and to a microinstruction Ⓡ as a reset input. The set output of the flip flop $F_1$ is supplied to the AND gates $g_{11}$ and $g_{12}$. It will be noted that the mode selector MS is available for determining whether audible sound information should be derived from the R register starting with the most significant digit position (the contact ②) or the least significant digit position (the contact ①).

When the mode selector MS is shifted to the contact ①, the AND gate $g_{11}$ is conductive to render the count increment control $A_1$ operative, thereby deriving audible sound information in the significance ascending order. The control $A_1$ adds "1" to the contents of the counter $C_2$. The first derived digit information is transferred to a buffer B within the central processor unit CU and eventually to the speaker SP.

Contrarily, the mode selector MS is slided to the contact 2, information is derived from the register R starting with the most significant digit position with the aid of the AND gate $g_{12}$ and the count decrement control $A_2$.

Moreover, pursuant to the teachings of the present invention, it is possible to produced audible sounds indicative of operation results in a selected one of languages provided that the ROM shown in FIG. 3 has several fragments containing different language voice storages.

While only certain embodiments of the present invention have been described, it will be apparent to those skilled in the art that various changes and modifications may be made therein without departing from the spirit and scope of the invention as claimed.

We claim:

1. A synthetic-speech calculator having a housing comprising:
   a keyboard having digit keys and function keys;
   a processor unit for performing operations on numerical information entered via said keyboard resulting in specific operation results of said keyed information;
   means for producing audible sound signals indicative of said operation results, said operation results being presented audibly digit by digit or, said operation results being capable of being audibly presented in groups each group comprising three-digits including a punctuation mark followed by another group comprising three-digits including a punctuation mark;
   mode selector means selectable on said housing for directing said synthetic-speech calculator to generate the audible sound signal either digit by digit or in three-digit groups.

2. A synthetic-speech calculator comprising:
   a keyboard having digit keys and function keys;
   a processor unit for performing operations on numerical information entered via said keyboard yielding operation results of said numerical information;
   means for producing audible sound signals indicative of said operation results in either the order of descending significance or the order of ascending significance;
   mode selector means selectable said housing and interconnected with said processor unit for directing said synthetic-speech calculator to generator audible sound signal in one of said orders selected by said mode selector means.

3. A synthetic-speech calculator as set forth in claim 1 further comprising means for imposing a pause period between said adjacent two three-digit groups separated by said punctuation marks.

4. A synthetic-speech calculator having a housing and a keyboard on said housing including means for generating audible sounds comprising:
   mode selector indication means selectable on said housing for directing said synthetic-speech calculator to generate a plurality of different types of said audible sounds, each of said types of sounds in the aggregate having a uniquely different order of sound generation from each other;
   means responsive to said indication of said mode selector means and to actuation of said keys on said keyboard for producing an audible sound signal indicative of said keyed information and operational processed results of said keyed information, said audible sound signal being generated in accordance with said indication of said mode selector indication means; and
   sound generation means responsive to said audible sound signal for generating an audible sound representative of a specifically keyed item of data, or an operational result of said keyed data information, said sound being generated in specific predetermined groups, said specific groups of said audible sound being determined by the location of the natural pause points inherent to each of said specifically keyed items of data and to each of said operational results of said keyed information.

5. A synthetic-speech calculator in accordance with claim 4 wherein said audible sound is generated in response to actuation of a selected one of said keys on said keyboard.

6. A synthetic-speech calculator in accordance with claim 4 wherein each of said predetermined groups of said audible sound is generated in response to actuation of a selected one of said keys on said keyboard.

7. A synthetic-speech calculator in accordance with claim 4 wherein said specifically keyed item of data and said operational results of said keyed information being indicated by said audible sound comprise an integer and a numerical fraction separated by a decimal point.

8. A synthetic-speech calculator in accordance with claim 7 wherein each of said predetermined groups of said integer constituting said keyed items of data and operational results of said keyed information and being indicated by said audible sound produced by said sound generating means is three-digits in length, the location of said natural pause points separating each of said predetermined groups of said integer being between every other third and fourth digit between two consecutive ones of said predetermined three-digit groups comprising said integer, said two consecutive ones of said predetermined groups of said integer being located relative to and beginning with the least significant digit of said integer and ending with the most significant digit of said integer.

9. A synthetic-speech calculator in accordance with claim 8 wherein said decimal point is audibly sounded with said group comprising said least significant digit of said integer.

10. A synthetic-speech calculator in accordance with claim 9 wherein said numerical fraction is audibly sounded in the aggregate as one of said predetermined groups, said audible sound of said group including said numerical fraction being sounded following said audible sound indicative of said group including said decimal point.

11. A synthetic-speech calculator in accordance with claim 10 wherein all of said audible sounds indicative of said predetermined groups comprising said integer, said decimal point, and said numerical fraction are generated in response to one key actuation of a selected one of said keys on said keyboard.

12. A synthetic-speech calculator in accordance with claim 10 wherein each of said audible sounds indicative of each of said predetermined groups within said integer and said group indicative of said numerical fraction are generated in response to a key-actuation of said selected one of said keys on said keyboard, said audible sound indicative of each one of said groups being generated in response to said key actuation.

13. A synthetic-speech calculator in accordance with claim 7 wherein each of said predetermined groups of said integer and said numerical fraction constituting said keyed items of data and operational results of said keyed information being indicated by said audible sound produced by said sound generating means is one digit in length, each of said audible sounds representative of each of said one-digit predetermined groups comprising said integer and numerical fraction being generated in response to actuation of a selected one of said keys on said keyboard.

14. A synthetic-speech calculator in accordance with claim 13 wherein said decimal point is audibly sounded by said sounding means with said one-digit predetermined group comprising the least significant digit of said integer constituting said keyed items of data and operational results of said keyed information.

15. A synthetic-speech calculator in accordance with claim 11 wherein said audible sound generated by said sounding means further comprises a pause period, said pause period being interposed between two of said consecutive predetermined groups and being located at said location of said natural pause points.

16. A synthetic-speech calculator having a housing comprising:
a keyboard having digit keys and function keys;
a processor unit for performing operations on numerical information entered via said keyboard resulting in specific operation results of said keyed information;
means for producing audible synthetic speech sound signals indicative of said operation results, said operation results being capable of being audibly presented in groups of digits wherein the number of digits in each group is less than the total number of digits representing said operation result;
voice start key means; and
means responsive to said voice start key means for generating one of said groups of audible synthetic speech sound signals in response to each actuation of said voice start key means.

* * * * *